(12) United States Patent
Blau et al.

(10) Patent No.: US 10,963,182 B2
(45) Date of Patent: Mar. 30, 2021

(54) SYSTEM AND METHOD FOR ON-DEMAND RECOVERY POINTS

(71) Applicant: Nutanix, Inc., San Jose, CA (US)

(72) Inventors: Eric Blau, Raleigh, NC (US); Hui Ding, Chapel Hill, NC (US); Kai Tan, Durham, NC (US); Pranab Patnaik, Cary, NC (US); Vivek Venkatesan, Morrisville, NC (US)

(73) Assignee: Nutanix, Inc., San Jose, CA (US)

( * ) Notice: Subject to any disclaimer, the term of this patent is extended or adjusted under 35 U.S.C. 154(b) by 11 days.

(21) Appl. No.: 16/506,980

(22) Filed: Jul. 9, 2019

(65) Prior Publication Data

US 2020/0379646 A1 Dec. 3, 2020

Related U.S. Application Data

(60) Provisional application No. 62/854,294, filed on May 29, 2019.

(51) Int. Cl.
*G06F 3/06* (2006.01)
*G06F 9/455* (2018.01)

(52) U.S. Cl.
CPC ............ *G06F 3/065* (2013.01); *G06F 3/0619* (2013.01); *G06F 3/0664* (2013.01); *G06F 3/0673* (2013.01); *G06F 9/45558* (2013.01)

(58) Field of Classification Search
CPC ....... G06F 9/45558; G06F 2009/45591; G06F 2009/45562; G06F 2201/805; G06F 2201/84; G06F 3/0619; G06F 3/065; G06F 3/0673; G06F 3/066; G06F 3/0664

USPC .......................................................... 711/162
See application file for complete search history.

(56) References Cited

U.S. PATENT DOCUMENTS

| | | | |
|---|---|---|---|
| 7,725,671 B2 | 5/2010 | Prahlad et al. |
| 7,840,533 B2 | 11/2010 | Prahlad et al. |
| 7,882,067 B2 | 2/2011 | Saika |
| 8,121,981 B2 | 2/2012 | Simek et al. |
| 8,239,584 B1 | 8/2012 | Rabe et al. |
| 8,423,731 B1 | 4/2013 | Nadathur et al. |
| 8,447,728 B2 | 5/2013 | Prahlad et al. |
| 8,549,518 B1 | 10/2013 | Aron et al. |
| 8,601,473 B1 | 12/2013 | Aron et al. |
| 8,762,335 B2 | 6/2014 | Prahlad et al. |
| 8,850,130 B1 | 9/2014 | Aron et al. |

(Continued)

OTHER PUBLICATIONS

Mozy Support Article—How-do-I-restore-an-earlier-copy-of-a-file, "Restore from a previous date, using the Mozy backup software," (accessed Sep. 25, 2019) retrieved from http://support.mozy.com/articles/en_US/FAQ/How-do-I-restore-an-earlier-copy-of-a-file, (Article Date: Aug. 20, 2018).

(Continued)

*Primary Examiner* — Hashem Farrokh
(74) *Attorney, Agent, or Firm* — Foley & Lardner LLP

(57) ABSTRACT

An illustrative embodiment disclosed herein is an apparatus including a processor having programmed instructions to determine a frequency rate for tracking changed data of a virtual machine (VM), track the changed data at the determined frequency rate, receive a request to generate a recovery point associated with a specified time, and, responsive to receiving the request to generate the recovery point associated with the specified time, generate the recovery point.

24 Claims, 3 Drawing Sheets

(56) References Cited

U.S. PATENT DOCUMENTS

| | | |
|---|---|---|
| 9,451,023 B2 | 9/2016 | Sancheti et al. |
| 9,495,435 B2 | 11/2016 | Zhang et al. |
| 9,740,723 B2 | 8/2017 | Prahlad et al. |
| 9,772,866 B1 | 9/2017 | Aron et al. |
| 9,892,123 B2 | 2/2018 | Kottomtharayil et al. |
| 10,210,048 B2 | 2/2019 | Sancheti |
| 10,248,657 B2* | 4/2019 | Prahlad et al. |
| 2011/0047541 A1* | 2/2011 | Yamaguchi ......... G06F 9/45558 718/1 |
| 2018/0276085 A1* | 9/2018 | Mitkar ................ G06F 9/45558 |
| 2019/0155699 A1* | 5/2019 | Luo ..................... G06F 11/1451 |
| 2020/0112513 A1* | 4/2020 | Iyengar .................. H04L 43/10 |
| 2020/0252264 A1* | 8/2020 | Arora ................... H04L 41/069 |

OTHER PUBLICATIONS

Cano, Ignacio, et al. "Curator: Self-Managing Storage for Enterprise Clusters" (Mar. 27, 2017), from https://www.usenix.org/conference/nsdi17/.

\* cited by examiner

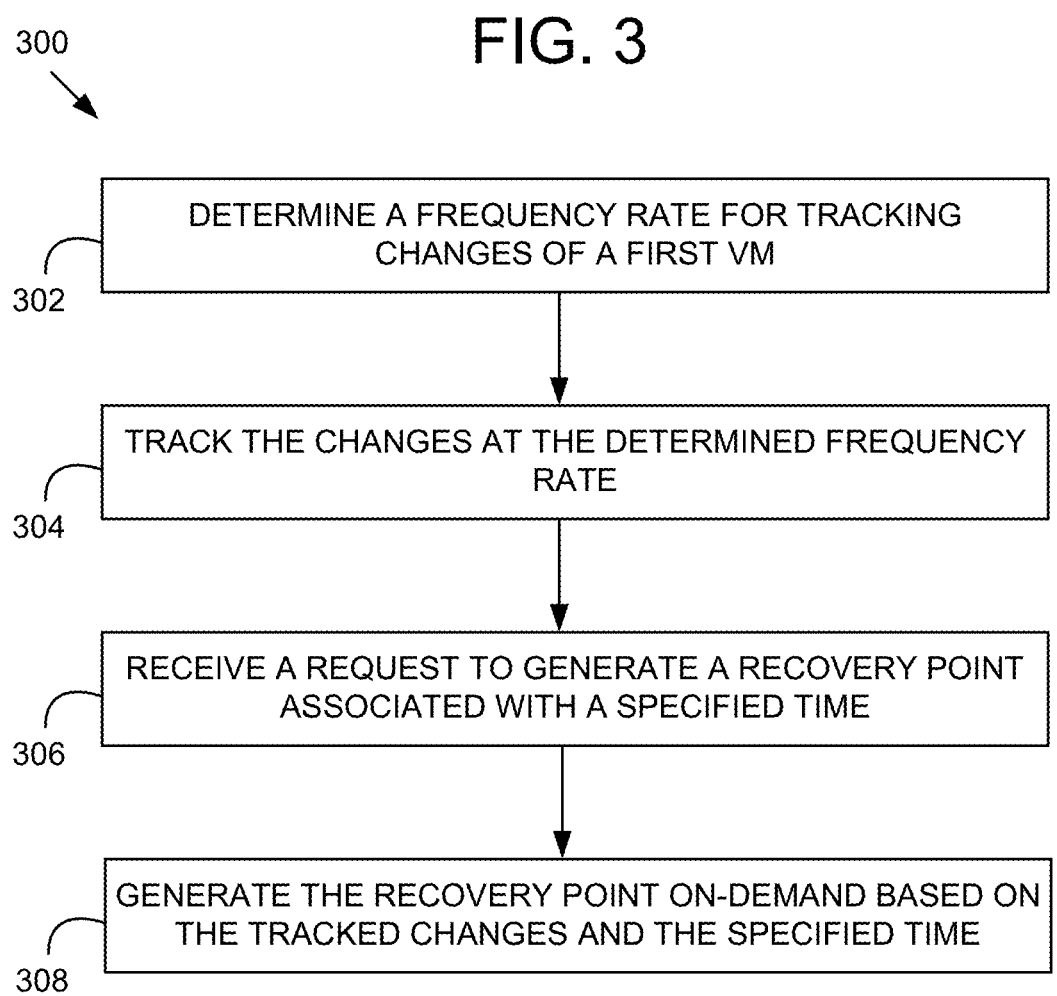

SYSTEM AND METHOD FOR ON-DEMAND RECOVERY POINTS

CROSS-REFERENCE TO RELATED APPLICATION

This application is related to and claims priority under 35 U.S. § 119(e) from U.S. Patent Application No. 62/854,294, filed May 29, 2019, titled "SYSTEM AND METHOD FOR VM CLONING IN A SOFTWARE DEFINED STORAGE ENVIRONMENT," the entire contents of which are incorporated herein by reference for all purposes.

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

SUMMARY

Aspects of the present disclosure relate generally to a virtualization environment, and more particularly to a system and method for recovering an entity on-demand.

An illustrative embodiment disclosed herein is an apparatus including a processor having programmed instructions to determine a frequency rate for tracking changed data of a virtual machine (VM), track the changed data at the determined frequency rate, receive a request to generate a recovery point associated with a specified time, and, responsive to receiving the request to generate the recovery point associated with the specified time, generate the recovery point.

Another illustrative embodiment disclosed herein is a non-transitory computer-readable storage medium having instructions stored thereon that, upon execution by a processor, causes the processor to perform operations comprising determining a frequency rate for tracking changed data of a virtual machine (VM), tracking the changed data at the determined frequency rate, receiving a request to generate a recovery point associated with a specified time, and, responsive to receiving the request to generate the recovery point associated with the specified time, generating the recovery point.

Another illustrative embodiment disclosed herein is a computer-implemented method comprising determining a frequency rate for tracking changed data of a virtual machine (VM), tracking the changed data at the determined frequency rate, receiving a request to generate a recovery point associated with a specified time, and, responsive to receiving the request to generate the recovery point associated with the specified time, generating the recovery point.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3 is an example method for on-demand recovery, in accordance with some embodiments of the present disclosure.

Figure 1:
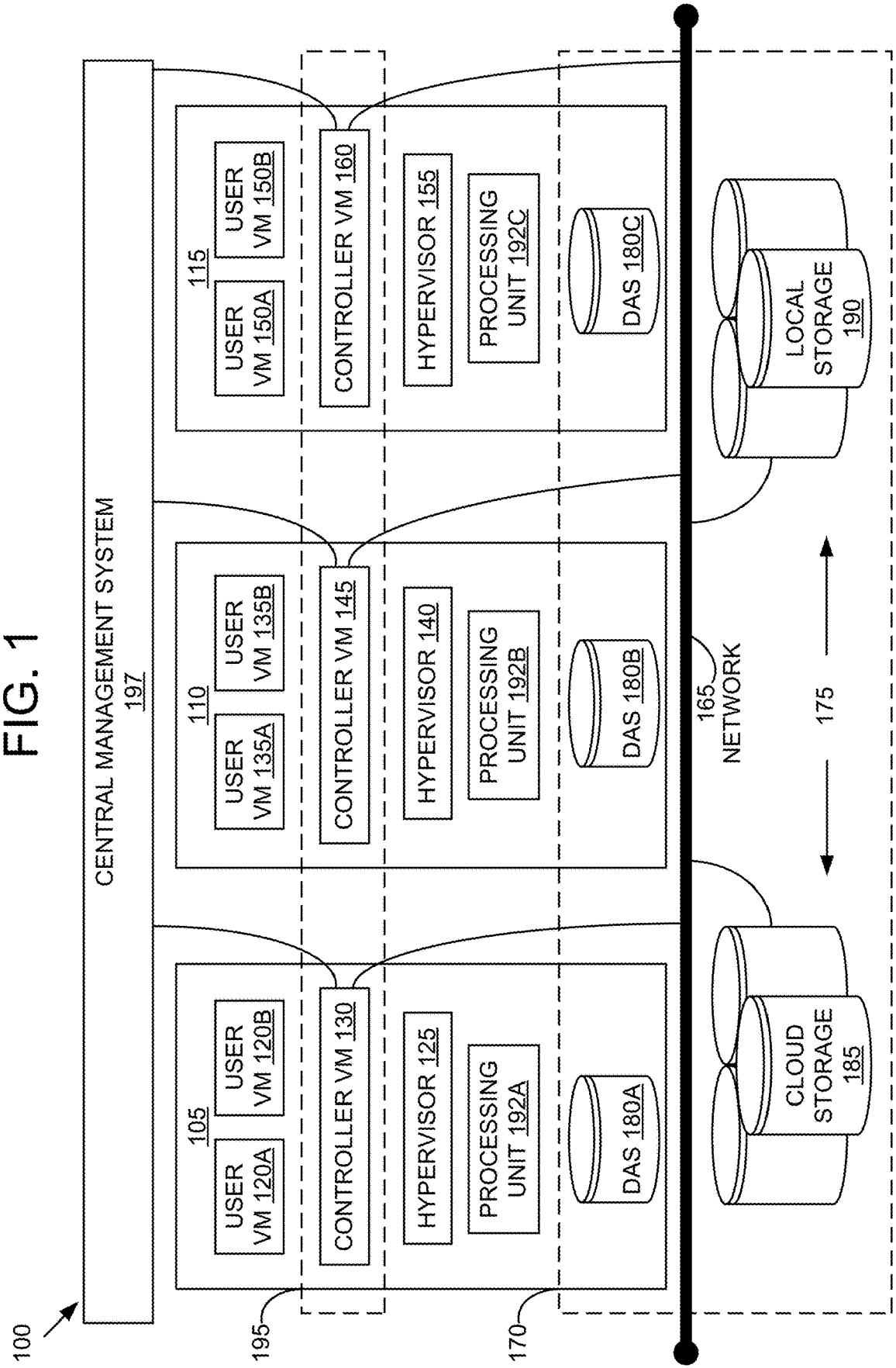
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Data recovery or backup typically relies on a schedule to create snapshots that are recovery points for the entity being protected. The snapshots may capture the state of the entity at pre-determined points in time as specified in the schedule. When the user needs to recover or clone an entity, a list of snapshots may be presented for the user to pick. In the conventional approach, the user has to select a recovery point from the list of snapshots. As systems become capable of lower recovery point objective (RPO), the number of snapshots presented to the user to pick from is large and becomes unusable. The resources required by the storage system to maintain and manage the large number of potential recovery points adds cost and complexity. What is needed is an on-demand recovery system.

In some embodiments of the disclosure presented herein, generation of the recovery point may be deferred. In some embodiments, a storage system may track changes to an entity. In some embodiments, when the user needs to restore and/or clone an entity, the user may specify a time associated with data from which the entity is restored and/or cloned. The storage system may track changes to the data made by the entity using an internal low cost and/or low overhead mechanism, such as a file system journal. This change tracking may be autonomously performed by the storage system at a pre-determined frequency that may be determined by the storage system based on system resources and change rate. At the time of recovery, the storage system may generate the recovery point on-demand using the appropriate tracked changes that are determined via the user's time input. The storage system may enable the restore and/or clone operation.

In some embodiments of the present disclosure, the storage system provides an provides an intuitive way to consider restoring data by allowing a user to specify a date and time to roll back to and then have the system automatically create a restore point that corresponds to that date and time. The storage system may not instantiate the recovery point until the user requests the date and time to restore. Some embodiments of the present disclosure allow for less overhead by not generating recovery points that will never be requested by the customer and that will end up aging out according to a schedule and never actually used. The storage system does not require the user to scroll through a list of snapshots to find the desired restore point. Furthermore, the storage system does not save data associated with the change tracking mechanism. Thus, the storage system can be leveraged to track data at a higher frequency and retain the data for a longer time than the conventional systems, given the same amount of system resources.

Virtualization Technology and Environment

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller VM 145, and the third node 115 includes user VMs 150A and 150B (collectively referred to herein as "user VMs 150"), a hypervisor 155, and a controller VM 160. The controller VM 130, the controller VM 145, and the controller VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage (NAS) 175 and direct-attached storage (DAS) 180A, 180B, and 180C (collectively referred to herein as DAS 180). The NAS 175 is accessible via the network 165 and, in some embodiments, may include cloud storage 185, as well as local storage area network 190 (also referred to as networked storage 190). In contrast to the NAS 175, which is accessible via the network 165, the DAS 180 includes storage components that are provided internally within each of the first node 105, the second node 110, and the third node 115, respectively, such that each of the first, second, and third nodes may access its respective DAS without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller VM 130, the controller VM 145, and the controller VM 160, and/or the hypervisor 125, the hypervisor 140, and the hypervisor 155. One or more of the first node 105, the second node 110, and the third node 115 may be organized in a variety of network topologies.

Also, the first node 105 may include one or more processing units 192A, the second node 110 may include one or more processing units 192B, and the third node 115 may include one or more processing units 192C. The processing units 192A, 192B, and 192C are collectively referred to herein as the processing units 192. The processing units 192 may be configured to execute instructions. The instructions may be carried out by a special purpose computer, logic circuits, or hardware circuits of the first node 105, the second node 110, and the third node 115. The processing units 192 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units 192, thus, execute an instruction, meaning that they perform the operations called for by that instruction.

The processing units 192 may be operably coupled to the storage pool 170, as well as with other elements of the first node 105, the second node 110, and the third node 115 to receive, send, and process information, and to control the operations of the underlying first, second, or third node. The processing units 192 may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. The RAM may be stand-alone hardware such as RAM chips or modules. Further, each of the processing units 192 may include a single stand-alone processing unit, or a plurality of processing units that use the same or different processing technology.

With respect to the storage pool 170 and particularly with respect to the DAS 180, each of the DAS 180 may include a variety of types of memory devices. For example, in some embodiments, one or more of the DAS 180 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 175 may include any of a variety of network accessible storage (e.g., the cloud storage 185, the local storage area network 190, etc.) that is suitable for use within the virtual computing system 100 and accessible via the network 165. The storage pool 170, including the NAS 175 and the DAS 180, together form a distributed storage system configured to be accessed by each of the first node 105, the second node 110, and the third node 115 via the network 165, the controller VM 130, the controller VM 145, the controller VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller VM 130, the controller VM 145, and the controller VM 160. The controller VM 130, the controller VM 145, and the controller VM 160 are configured to communicate with each other via the network 165 to form a distributed system 195. Each of the controller VM 130, the controller VM 145, and the controller VM 160 may also include a local management system configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller VM 130, the controller VM 145, the controller VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller VM (e.g., the controller VM 130, the controller VM 145, or the controller VM 160, respectively) on the underlying node (e.g., the first node 105, the second node 110, or the third node 115, respectively). Upon receiving the input/output request, that controller VM may direct the input/output request to the controller VM (e.g., one of the controller VM 130, the controller VM 145, or the controller VM 160) of the leader node. In some cases, the controller VM that receives the input/output request may itself be on the leader node, in which case, the controller VM does not transfer the request, but rather handles the request itself.

The controller VM of the leader node may fulfil the input/output request (and/or request another component within the virtual computing system 100 to fulfil that request). Upon fulfilling the input/output request, the controller VM of the leader node may send a response back to the controller VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Additionally, in some embodiments the virtual computing system 100 includes a central management system 197 that is configured to manage and control the operation of the various clusters in the virtual computing system. In some embodiments, the central management system 197 may be configured to communicate with the local management systems on each of the controller VM 130, the controller VM 145, the controller VM 160 for controlling the various clusters.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

VM Cloning in a Software Defined Storage Environment

Figure 2:
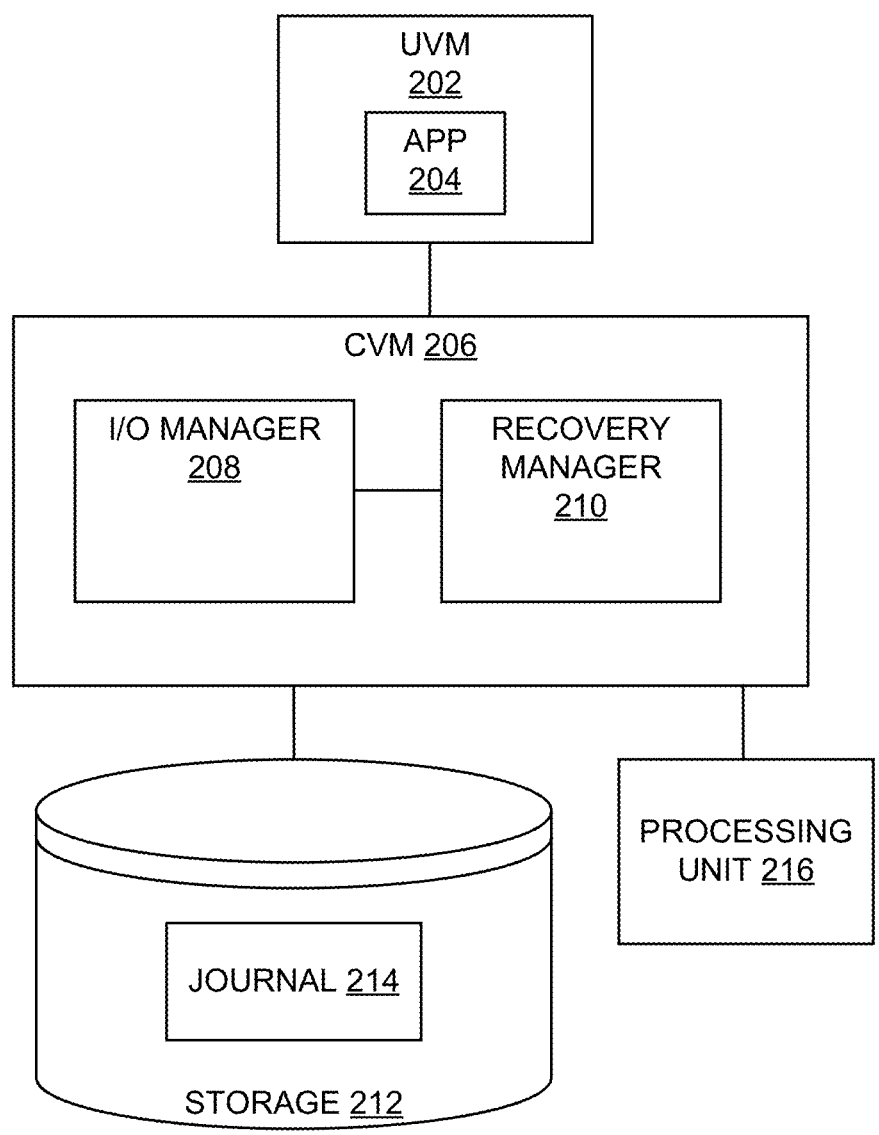
FIG. 2 is an example embodiment of a storage system for on-demand recovery, in accordance with some embodiments of the present disclosure.

Referring now to FIG. 2, an example embodiment of a storage system 200 for on-demand recovery. The storage system 200 includes a UVM 202 executing an application 204 and having read/write access to the data of storage 212, including a journal 214. The system includes a CVM 206 including an input/output (I/O) manager 208 and a recovery manager 210. In some embodiments, some or all of the components (e.g. the UVM 202, the CVM 206, the I/O manager 208 and/or the recovery manager 210) of the storage system 200 may include one or more processing devices (e.g., the processing unit 216). The one or more processing devices may include one or more devices executing operations in response to instructions stored electronically on an electronic storage medium (e.g. the storage 212 or RAM).

A processing device associated (e.g. the processing unit 216) with the I/O manager 208 may track changes to the data of an entity such as UVM 202. For sake of brevity, actions by the processing device associated I/O manager 208 are referred to as actions by the I/O manager 208 herein. A change to the data of the UVM 202 occurs when the UVM 202 writes data. For example, a processing device associated with the UVM 202 may write data to the storage 212 or the RAM responsive to executing the application 204. In some embodiments, a processing device associated with the application 204 may write data to the storage 212 or the RAM.

The I/O manager 208 may track changed data (e.g. writes) by appending metadata about the changed data to the journal 214. The metadata is referred to herein as markers. Each marker may include a start location of the changed data, a length of the changed data, and/or a time that the marker was appended to the journal 214, among others. In some embodiments, a marker may include a plurality of start locations and a plurality of lengths, for example, if the changed data is not logically contiguous. The time that the data changed is referred to herein as a timestamp. In some embodiments, the location of the changed data includes a pointer to the memory address where the data was written to.

In some embodiments, the journal 214 is a log-based data structure. In this regard, units of metadata are written sequentially to logical addresses of the journal 214. For example, if a first unit of metadata is written to a first logical address range X to X+Y, then a second unit of metadata written directly after the first unit of metadata is written to a second logical address range X+Y+1 to X+Y+Z. In some embodiments, the journal 214 includes an append point that identifies the next available logical address. In some embodiments, the journal is a ring-like data structure. For example, after a first unit of metadata is written to a last logical address of the journal 214, the append point indicates that the first logical address of the journal 214 is the next available logical address. In some embodiments, the journal 214 may be located in an SSD portion of the storage 212. In some embodiments, the journal 214 may be located in a flash memory portion of the storage 212. In some embodiments, the journal 214 may be located in a single-level cell (SLC) portion of the storage 212, a multiple-level cell (MLC) portion of the storage 212, or a combination of the two.

In some embodiments, the I/O manager 208 transfer selected units of metadata in the journal 214 to a second portion of the storage 212. A unit of metadata may be selected for transfer based on one or more criteria such as. In some embodiments, the unit of metadata is selected based on being least recently used metadata. In this regard, the unit of metadata may be selected for transfer based on a length of time starting at a first time when the unit of metadata was written to and ending at current time. The length of time may be compared to a pre-determined length of time. The unit of metadata may be selected based on the length of time satisfying (e.g. being greater than) the pre-determined length of time. In some embodiments, the length of time is reset each time metadata for a changed data is updated. In some embodiments, the unit of metadata is selected for transfer based on a logical distance between a logical address of the unit of metadata and the append point. The logical distance may be compared to a pre-determined logical distance. The unit of metadata may be selected based on the logical distance satisfying the pre-determined logical distance.

In some embodiments, an updated unit of metadata is written to a different logical address than a previous version of the unit of metadata. In some embodiments, an address of the previous version of the unit of metadata may be indicated in the updated unit of data. In some embodiments, the I/O manager 208 performs a garbage cleanup of the previous versions of any unit of metadata from the journal 214. In this regard, the I/O manager 208 may scan the journal 214 and re-append the updated units of metadata at a first portion of the journal 214 and place the append point immediately after the first portion of the journal 214.

The I/O manager 208 may determine a frequency rate for tracking the changed data. The frequency rate may determine how frequent markers are appended to the journal 214. For example, if the frequency rate is once per second, then when a write occurs, the I/O manager 208 may wait until the next second to append the marker. The frequency rate may be determined based on a capability of the system resources. The capability of the system resources may include an amount of storage space in the storage 212 allocated for the journal 214. In some embodiments, the I/O manager 208 determines a number of UVMs, such as UVM 202, for which changed data is tracked. In some embodiments, the number of UVMs for which changed data is tracked is same as the number of UVMs that are assigned to the journal 214 (or one of a plurality of journals 214). The I/O manager 208 may calculate an amount of available storage space per UVM as a quotient of the amount of available storage space for the journal 214 and the number of UVMs.

The I/O manager 208 may estimate an amount of storage space needed for tracking data for one VM. For example, the I/O manager 208 may estimate a size of a marker (e.g. an entry). The I/O manager 208 may estimate the size of the marker based on historical data I/O patterns. The estimated size of the marker may vary based on the frequency rate. The I/O manager 208 may identify a retention period. The retention period may be pre-determined by a policy or a user or dynamically selected by the I/O manager 208 based on how much data is being written to the corresponding VM at the time the estimation is being performed. The I/O manager 208 may identify a frequency rate. The I/O manager 208 may estimate the storage space needed as a product of the estimated size of a marker and the number of markers created in the retention period. The I/O manager 208 may iterate the estimation for multiple frequency rates. The I/O manager 208 may determine a maximum frequency rate such that an amount of storage space for tracking data for one VM at the maximum frequency rate is less than (or equal to) the amount of available storage space per VM and an amount of storage space for tracking data for one VM at a frequency rate at one increment higher than the maximum frequency rate is greater than the amount of the available storage space per VM.

In some embodiments, the system 200 includes a plurality of UVMs 202 and the storage 212 includes a plurality of journals 214. In some embodiments, each UVM 202 is assigned a different journal 214. In some embodiments, the estimated amount of storage space for tracking data for one UVM 202 may take into account replication. For example, if a replication policy states that metadata in the journal 214 for one UVM 202 is to be replicated to five other journals 214 assigned to five other UVMs 202, then the estimated amount of storage space for tracking data for one UVM 202 may be six times as much as when there is no replication policy.

The capability of the system resources may include the CPU usage, the memory usage, the I/O usage, among others. The discussion herein is on the CPU usage without departing from the scope of the disclosure. The I/O manager 208 may determine a baseline CPU usage. The I/O manager may determine a delta CPU usage in order to track changed data at a frequency rate. The I/O manager 208 may determine a frequency rate such that a total CPU usage (including the baseline CPU usage and the delta CPU usage) does not exceed a predefined CPU usage threshold. In some embodiments, the I/O manager 208 may determine a frequency rate such that the delta CPU usage does not exceed a second predefined CPU usage threshold, without a priori knowledge of the baseline CPU usage.

The frequency rate may be determined based on a write frequency of the UVM 202. The write frequency may be how often the processing device associated with the UVM 202 and/or the application 204 writes data. In some embodiments, the write frequency may be a function (e.g. an average, a moving average) of historical write frequency patterns. The historical write frequency patterns may be observed in metadata. In some embodiments, the I/O manager 208 may determine a frequency rate that does not exceed a combination (e.g. ratio, proportion, or another function) of the write frequency and a predefined number. In some embodiments, the I/O manager 208 may determine the frequency rate as a lower one of a first frequency rate that does not result in a CPU usage exceeding a predefined CPU usage threshold and a second frequency rate that does not exceed a combination of the write frequency and a predefined number. In some embodiments, the recovery manager 210 may determine the frequency rate.

A processing device associated (e.g. the processing unit 216) with the recovery manager 210 may receive a specified time associated with a requested recovery. For sake of brevity, actions by the processing device associated with the recovery manager 210 are referred to as actions by the recovery manager 210 herein. The recovery manager 210 may receive the specified time from a user via a user interface or from the system based on rules (e.g. a service level agreement or policy). In some embodiments, the user interface is a part of the recovery manager 210. In some embodiments, the user interface is a separate component form the recovery manager 210. The recovery manager 210 may forward the specified time to the I/O manager 208.

The I/O manager 208 may generate a recovery point. In some embodiments, the recovery point may be synthesized from a set of markers that were appended before the specified time. The I/O manager 208 may determine the set of markers that were appended before the specified time. In some embodiments, the I/O manager 208 may access the journal 214 that maps a location of the changed data to a time the marker of the changed data appended to the journal 214. The I/O manager 208 may sort the journal 214 based on the time the markers were appended. The I/O manager 208 may select the set of markers from the sorted markers that were appended before the specified time. The I/O manager 208 may aggregate the set of markers. In some embodiments, two or more markers of the set of markers may track the same changed data. In some embodiments, the I/O manager 208 may select the later marker of the two or more markers and delete or ignore the earlier marker of the two or more markers. The I/O manager 208 may send the recovery point to the recovery manager 210.

In some embodiments, I/O manager 208 synthesizes (e.g. generates) the recovery point from a baseline snapshot and the changed data corresponding to the set of markers determined by the I/O manager 208. For example, the system 200 generates baseline snapshots every hour and appends markers every minute. If the system 200 receives a request to synthesize the recovery point at 9:30 AM, the system 200 fetches the baseline snapshot from 9:00 AM and retrieves the markers tracking the changes from 9:00 AM to 9:30 AM. The system 200 adds the changed data corresponding with the markers between 9:00 AM to 9:30 AM to the baseline snapshot to synthesize the recovery point. This is different from the copy-and-write technique, where a snapshot, sometimes incremental, is generated every time data is written.

The recovery manager 210 may apply the recovery point. The recovery manager 210 may recover and/or clone UVM 202 on a second VM. In some embodiments, the I/O manager 208 may apply the recovery point to a second UVM. In some embodiments, the I/O manager 208 or the recovery manager 210 deletes the recovery point after the UVM 202 is recovered and/or cloned.

The UVM 202 may be an instance of the user VM 120a with respect to FIG. 1. The CVM 206 may be an instance of the controller VM 130 with respect to FIG. 1. The storage 212 may be an instance of one or more of the DAS 180, the cloud storage 185, and/or the local storage 190 with respect to FIG. 1. The processing unit 216 may be an instance of the processing unit 192A with respect to FIG. 1.

Referring now to FIG. 3, an example method 300 for on-demand recovery is shown. The method 300 may be implemented using, or performed by, the components of the storage system 200, which is detailed herein with respect to FIG. 2. Additional, fewer, or different operations may be performed in the method 300 depending on the embodiment. In some embodiments, the method 300 may be implemented in one or more processing devices (e.g., the processing unit 216). The one or more processing devices may include one or more devices executing some or all of the operations of the method 300 in response to instructions stored electronically on an electronic storage medium (e.g. the storage 212 or RAM). The one or more processing devices may include one or more devices configured through hardware, firmware, and/or software to be specifically designed for execution of one or more of the operations of the method 300.

At operation 302, an I/O manager, such as the I/O manager 208, may determine a frequency rate for tracking changes of a first VM, such as the UVM 202. At operation 304, the I/O manager may track the changes at the determined frequency rate. In some embodiments, the I/O manager may append a marker to a data structure, such as the journal 214, in an electronic storage medium, such as the storage 212. In some embodiments, the I/O manager may determine the frequency rate for tracking the changed data based on system resources of the VM and a write frequency of the VM.

At operation 306, the I/O manager may receive a request to generate a recovery point associated with a specified time. In some embodiments, the I/O manager may determine a set of markers appended before the specified time. In some embodiments, the I/O manager may aggregate the set of markers. At operation 308, the I/O manager may generate the recovery point on-demand based on the changed data associated with the set of markers and the specified time. In some embodiments, the I/O manager may generate the recovery point on-demand based on a baseline snapshot. In some embodiments, the apply the recovery point to a second VM.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. An apparatus comprising a processor having programmed instructions to:
    determine a frequency rate as a maximum frequency rate that satisfies an estimated amount of system resources needed for tracking changed data of a virtual machine (VM) and being less than an available amount of system resources;
    track the changed data at the determined frequency rate by storing a marker including a timestamp and a pointer to memory where the changed data is written;
    receive a request to generate a recovery point associated with a specified time; and
    responsive to receiving the request to generate the recovery point associated with the specified time, generate the recovery point from a baseline snapshot and the changed data, wherein the changed data corresponds to the marker with the timestamp, wherein the timestamp is between a baseline snapshot time and the specified time.

2. The apparatus of claim 1, the processor having further programmed instructions to generate the baseline snapshot at every first interval period and append the marker at every second interval period.

3. The apparatus of claim 1, the processor having further programmed instructions to determine the frequency rate for tracking the changed data of the VM based on an estimated amount of system resources needed for tracking the changed data and wherein the frequency rate is also based on a number of VMs for which the changed data is being tracked.

4. The apparatus of claim 1, the processor having further programmed instructions to append the marker to a data structure before the specified time, wherein the marker includes metadata about the changed data.

5. The apparatus of claim 4, wherein the marker includes a starting address of the changed data, a length of the changed data, and a time that the marker was appended to the data structure.

6. The apparatus of claim 4, the processor having further programmed instructions to:
    determine that the marker was appended before the specified time.

7. The apparatus of claim 1, the processor having further programmed instructions to apply the recovery point on a second VM.

8. The apparatus of claim 1, the processor having further programmed instructions to apply the recovery point on a second VM.

9. The apparatus of claim 1, further comprising estimating storage space needed for tracking data for the VM.

10. The apparatus of claim 1, further comprising determining a delta CPU usage to track changed data.

11. A non-transitory computer readable storage medium having instructions stored thereon that, upon execution by a processor, causes the processor to perform operations comprising:
    determining a frequency rate as a maximum frequency rate that satisfies an estimated amount of system resources needed for tracking changed data of a virtual machine (VM) and being less than an available amount of system resources;
    tracking the changed data at the determined frequency rate by storing a marker including a timestamp and a pointer to memory where the changed data is written;
    receiving a request to generate a recovery point associated with a specified time; and
    responsive to receiving the request to generate the recovery point associated with the specified time, generating the recovery point from a baseline snapshot and the changed data, wherein the changed data corresponds to the marker with the timestamp, wherein the timestamp is between a baseline snapshot time and the specified time.

12. The non-transitory computer readable storage medium of claim 11, the operations further comprising generating the baseline snapshot at every first interval period and append the marker at every second interval period.

13. The non-transitory computer readable storage medium of claim 11, the operations further comprising determining the frequency rate for tracking the changed data of the VM based on an estimated amount of system resources needed for tracking the changed data and wherein the frequency rate is also based on a number of VMs for which the changed data is being tracked.

14. The non-transitory computer readable storage medium of claim 11, the operations further comprising appending the marker to a data structure before the specified time, wherein the marker includes metadata about the changed data.

15. The non-transitory computer readable storage medium of claim 14, wherein the marker includes a starting address of the changed data, a length of the changed data, and a time that the marker was appended to the data structure.

16. The non-transitory computer readable storage medium of claim 14, the operations further comprising:
    determining that the marker was appended before the specified time.

17. The non-transitory computer readable storage medium of claim 11, further comprising estimating storage space needed for tracking data for the VM.

18. The non-transitory computer readable storage medium of claim 11, further comprising determining a delta CPU usage to track changed data.

19. A computer-implemented method comprising:
    determining a frequency rate as a maximum frequency rate that satisfies an estimated amount of system resources needed for tracking changed data of a virtual machine (VM) and being less than an available amount of system resources;

tracking the changed data at the determined frequency rate by storing a marker including a timestamp and a pointer to memory where the changed data is written;
receiving a request to generate a recovery point associated with a specified time; and
responsive to receiving the request to generate the recovery point associated with the specified time, generating the recovery point from a baseline snapshot and the changed data, wherein the changed data corresponds to the marker with the timestamp, wherein the timestamp is between a baseline snapshot time and the specified time.

20. The method of claim 17, further comprising generating the baseline snapshot at every first interval period and append the marker at every second interval period.

21. The method of claim 19, further comprising determining the frequency rate for tracking the changed data of the VM based on an estimated amount of system resources needed for tracking the changed data and wherein the frequency rate is also based on a number of VMs for which the changed data is being tracked.

22. The method of claim 19, further comprising appending the marker to a data structure before the specified time, wherein the marker includes metadata about the changed data.

23. The method of claim 19, further comprising estimating storage space needed for tracking data for the VM.

24. The method of claim 19, further comprising determining a delta CPU usage to track changed data.

* * * * *